United States Patent [19]

Rosaen et al.

[11] 4,265,271

[45] May 5, 1981

[54] RELIEF VALVE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 68,009

[22] Filed: Aug. 20, 1979

[51] Int. Cl.³ ............................................. F16K 15/02
[52] U.S. Cl. .................................... 137/540; 137/542; 137/543.17; 137/543.19; 251/337
[58] Field of Search ........... 137/540, 542, 543, 543.17, 137/543.19; 251/337

[56] References Cited

U.S. PATENT DOCUMENTS

| 225,801 | 3/1880 | Crosby | 137/542 X |
|---|---|---|---|
| 1,250,503 | 12/1917 | Ray | 137/540 X |
| 1,890,223 | 12/1932 | Kilzel | 137/543 X |
| 2,969,804 | 1/1961 | Tolkien | 137/543.19 X |

*Primary Examiner*—William R. Cline
*Attorney, Agent, or Firm*—Gifford, VanOphem, Sheridan & Sprinkle

[57] ABSTRACT

A unique relief valve is provided for use with a fluid system and comprises a reducing bushing having a throughbore. The bushing is externally threaded for connection with a standard fluid connector and, similarly, is internally threaded around its throughbore for connection to a further fluid connector in the fluid system. A valve seat having a fluid passageway is secured to the bushing while a valve member cooperates with the valve seat and is movable between open positions and a closed position. In its closed position, the valve member closes the fluid passageway on the valve seat and thus prevents fluid flow through the reducing bushing while, conversely, with the valve member in its open positions, fluid communication is established through the reducing bushing throughbore. A helical spring abuts against the valve member at one end and, at its other end, against a spring seat and urges the valve member towards its closed position. The spring seat, moreover, is adjustable to thereby vary the compression of the spring and thus the pressure setting for the relief valve.

6 Claims, 6 Drawing Figures

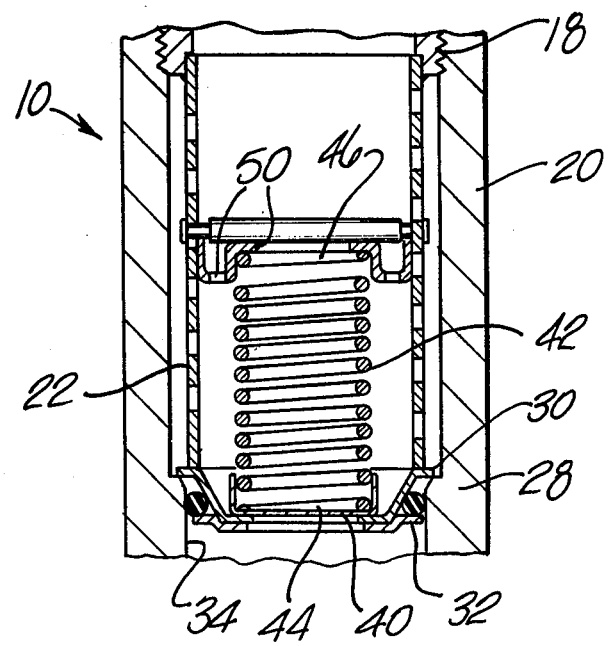
*Fig-3*
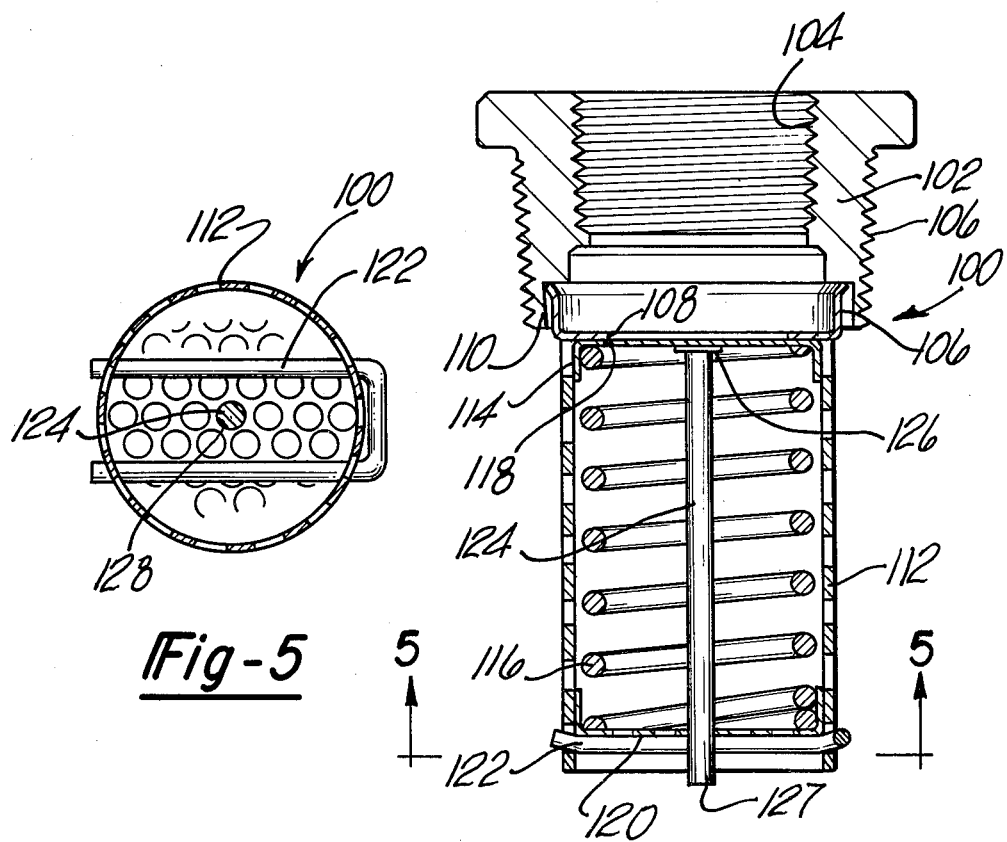
*Fig-4*
*Fig-5*

RELIEF VALVE

BACKGROUND OF THE INVENTION

I. Field of the Invention

The present invention relates generally to valves and, more particularly, to a one-way relief valve for use with a fluid system.

II. Description of the Prior Art

There have been a number of previously known one-way relief valves which have been used with fluid systems and particularly with hydraulic fluid systems. Such relief valves are designed to open at a predetermined pressure in order to permit fluid communication from the inlet of the valve and to its outlet. At all pressures below the predetermined opening pressure, however, the relief valve prohibits fluid communication between its inlet and outlet.

These previous known relief valves typically comprise a valve housing having an inlet and an outlet. A conventional fluid fitting is connected to the inlet while a similar fitting is connected to the outlet for connection with cooperating fluid connectors on the fluid system. This previously known construction, however, is disadvantageous in that the relief valve housing, typically a casting, is very expensive to fabricate. Thus, the housing with its fluid fittings significantly increases the overall cost for the relief valve.

A further disadvantage of these previously known relief valves having an opening pressure up to about 100 psi is that the opening pressure for such relief valves is commonly preset and nonadjustable. Consequently, it is either necessary to maintain an entire line of relief valves with different opening pressures in order to accommodate the different requirements for fluid systems, or to incorporate costly adjustment means.

Many of these previously known relief valves included a valve member which is resiliently urged towards a closed position against a valve seat and which opens only when the pressure on the valve member exceeds a predetermined amount. However, during pressure surges in the fluid system which are sufficient to open the relief valve, the valve member can become cocked within its housing which can jam the relief valve in an open position. Once the relief valve is stuck or jammed in its open position, disassembly of the relief valve is usually required in order to repair or unjam the valve member.

SUMMARY OF THE PRESENT INVENTION

The present invention provides an inexpensive relief valve which overcomes the above mentioned disadvantages of the previously known relief valves.

In brief, the relief valve according to the present invention comprises a reducing bushing having a throughbore. The reducing bushing is externally threaded for connection with a conventional fluid connector while, similarly, the bushing throughbore is internally threaded for connection to a second standard fluid connector. By this construction, the reducing bushing can be directly connected to a fluid system without the necessity of a cast housing for the relief valve and also by using a single fluid fitting, i.e. the reducing bushing.

An elongated perforated tube is coaxially secured to the reducing bushing while a valve seat is secured to one end of the tube. A valve member is disposed within the tube and is movable between a closed position in which the valve member abuts against the valve seat and prevents fluid flow through the reducing bushing through bore and an open position in which the valve member is spaced apart from the valve seat and thus permits fluid flow through the reducing bushing throughbore.

An elongated resilient member, preferably a helical spring is also disposed within the interior of the tube and abuts at one end against the valve member. A spring retainer is positioned within the tube at the other end of the spring and maintains the spring in a state of compression thus urging the valve member toward it closed position. The compression of the spring, and thus the pressure setting opening for the relief valve can be adjusted by adjusting the longitudinal position of the spring seat along the tube. This adjustment is achieved by means of a pin extending through selected diametrically opposed apertures in the perforated tube and which abuts against the spring retainer on the side opposite from the spring.

In order to prevent jamming of the relief valve, in the preferred form of the invention a guide plate having a perforation is transversely secured to the tube and also functions as the spring retainer. A guide rod is then secured at one end to the valve member and, at its other end, is slidably positioned through the guide plate perforation. The guide rod together with the guide plate permits the valve member to freely shift between its open and closed positions but prohibits the valve member from cocking, and possibly jamming, with respect to the axis of the tube.

BRIEF DESCRIPTION OF THE DRAWING

A better understanding of the present invention willbe had upon reference to the following detailed description, when read in conjunction with the accompanying drawing, wherein like reference characters refer to like parts throughout the several views, and in which:

FIG. 3 is a fragmentary sectional view illustrating the pressure setting adjustment for the relief valve according to the present invention;

FIG. 4 is a longitudinal sectional view illustrating yet another modification of the relief valve according to the present invention;

FIG. 5 is a sectional view taken substantially along lines 5—5 in FIG. 4; and

DETAILED DESCRIPTION OF THE PRESENT INVENTION

Figure 1:
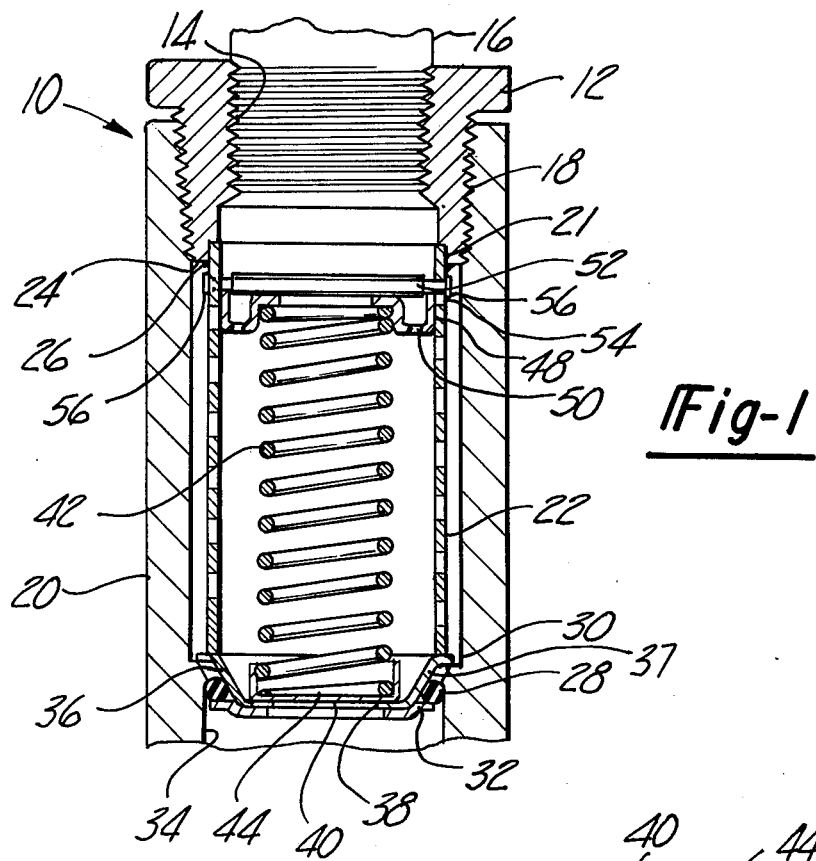
FIG. 1 is a longitudinal sectional view illustrating a relief valve according to the present invention.

With reference first to FIG. 1, the relief valve 10 according to the present invention is thereshown and comprises a fluid fitting or reducing bushing 12 having an axial through bore 14. The through bore 14 is internally threaded for connection with a conventional fluid connector 16 which forms a part of a fluid system (not shown). Similarly, the outer periphery 18 of the reducing bushing 12 is also threaded for connection with a housing 20 which is also part of the fluid system.

One end 21 of an elongated perforated tube 22 is coaxially secured to the end 24 of the reducing bushing 12 opposite from the fluid connector 16 so that the perforated tube 22 extends axially into the housing 20. A fluid seal 28, such as an O-ring, is secured to the other end 30 of the perforated tube 22 by an annular seal carrier 32. Upon connection of the relief valve 10 with the fluid connector 20, the seal 28 sealingly engages the inner periphery 34 of the connector housing 20.

An annular valve 36 having a tapered portion 37 and a central opening 38 is tranversely attached across the end 30 of the tube 22 so that the opening 38 is coaxial with the tube 22. A disc shaped valve member 40 cooperates with the valve seat 36 so that with the valve member 40 abutting against the seat 36 as shown in FIG. 1, the valve member 40 covers and closes the opening 38 and prohibits fluid flow therethrough. The tapered portion 37 of the seat 36 ensures that the valve member 40 is centered over and covers the opening 38.

An elongated helical spring 42 is coaxially positioned within the tube 22 and abuts against the valve member 40 at one end 44. At its other end 46, the spring 42 abuts against an annular spring retainer 48 positioned within the tube 22 at a position longitudinally spaced from the seat 36. The spring retainer 48 includes a number of openings 50 through it to permit fluid flow through the spring retainer 48. The spring retainer 48 is positioned within the tube 22 so as to maintain the spring 42 in a state of compression thus urging the valve member 40 against its valve seat 36.

With reference now to FIGS. 1 and 3, the spring retainer 48 is held in position within the tube 22 by means of a stop pin 52 positioned through diametrically opposed openings 54 in the tube 22. An enlarged diameter portion 56 on each end of the pin 52 locks the pin in place in the tube 22. The enlarged diameter portion 56 of the pin 52, however, is sufficiently small so that the entire pin 52 can pass through the tube openings 54.

With reference still to FIGS. 1 and 3, the longitudinal position of the spring retainer 48 can be varied along the tube 22 by simply inserting the pin 52 through a different set of diametric openings 54 in the tube 22. The longitudinal adjustment of the spring retainer 48 in turn adjusts the compression of the helical spring 42 to thereby vary the pressure setting opening of the valve member 40. For example, the compression of the helical spring 42 and thus the pressure setting opening of the relief valve is greater in FIG. 3 than in FIG. 1.

Figure 2:
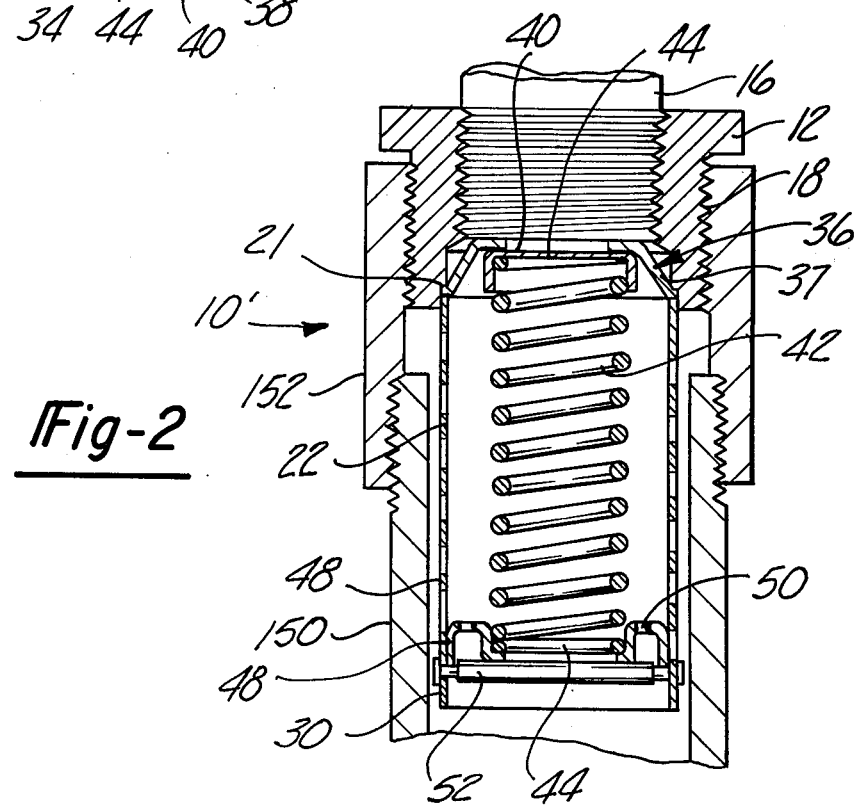
FIG. 2 is a longitudinal sectional view similar to FIG. 1 but illustrating a modification thereof.

With reference now to FIG. 2, a modified form of the relief valve 10' according to the present invention is thereshown. The relief valve 10' is identical to the relief valve 10 shown in FIG. 1 except that the valve seat 36 is secured to the upper end 21 of the tube 22 while the spring retainer 48 and its stop pin 52 are positioned adjacent the lower end 30 of the tube 22. Since the relative positions of the valve seat and its valve member in the relief valve 10' shown in FIG. 2 are in positions in opposite from the relief valve 10 illustrated in FIG. 1, the direction of flow through the relief valve is likewise reversed. For this reason, the relief valve 10' does not require either the seal 28 or its carrier 32. The relief valve 10' illustrated in FIG. 2 further differs from that shown in FIG. 1 in that the bushing 12 is connected to a conventional pipe 150 in the fluid system by a conventional pipe coupling 152. This arrangement thus eliminates the need for the machined housing 20 shown in FIG. 1.

With reference now to FIGS. 4 and 5, a still further modification of the relief valve 100 of the present invention is thereshown and comprises a reducing bushing 102 having an internally threaded throughbore 104 and externally threaded at 106 about its periphery. The reducing bushing 102 is adapted for connection with a pair of conventional fluid connectors (not shown) in the manner that has been previously described for the relief valve 10 in FIG. 1.

A valve seat 106 having a central opening 108 which forms a fluid passageway is coaxially secured to the end 110 of the reducing bushing 102 opposite from the throughbore 104. An elongated perforated tube 112 in turn is coaxially connected to the valve seat 106 so that the perforated tube 112 extends axially outwardly from the reducing bushing 102.

A disc shaped valve member 114 is longitudinally slidably positioned within the tube 112 so that with the valve member 114 abutting against the valve seat 106, the valve member 114 closes the fluid passageway 108. Conversely, with the valve member 114 spaced away from the valve seat 106, the valve member permits fluid flow through the central opening 108 of the valve seat 106.

A helical spring 116 is disposed within the tube 112 so that one end 118 of the spring 116 abuts against the valve member 114 and at its other end abuts against a disc shaped spring retainer 120. The helical spring 116 is in a state of compression between the valve member 114 and spring retainer 120 thus urging the valve member 114 towards its closed position.

The spring retainer 120 is secured in position to the tube 112 by means of a U-shaped clip 122 insertable through opposing bores in the perforated tube 112. Like the pin 52 (FIG. 1), the clip 122 can be selectively positioned through different and longitudinally spaced apertures along the perforated tube 112 in order to vary the compression of the helical spring 116 and thus the pressure opening setting for the relief valve 100.

The primary difference between the relief valve 100 illustrated in FIGS. 4 and 5 and the relief valves 10 and 10' illustrated in FIGS. 1-3, however, is the provision of an elongated guide rod 124 secured at one end 126 to the valve member 114. The guide rod 124 extends coaxially through the tube 112 so that its other end 127 slidably extends through an aperture 128 formed in the spring retainer 120. The guide rod 124 thus serves to maintain the orientation of the valve member 114 coaxial with respect to the tube 112 as the valve member 114 longitudinally moves from its closed and to its open position. The guide rod 124 thus prevents the valve member 114 from cocking in the event of a sudden pressure surge and possibly jamming within the perforated tube 112.

Figure 6:
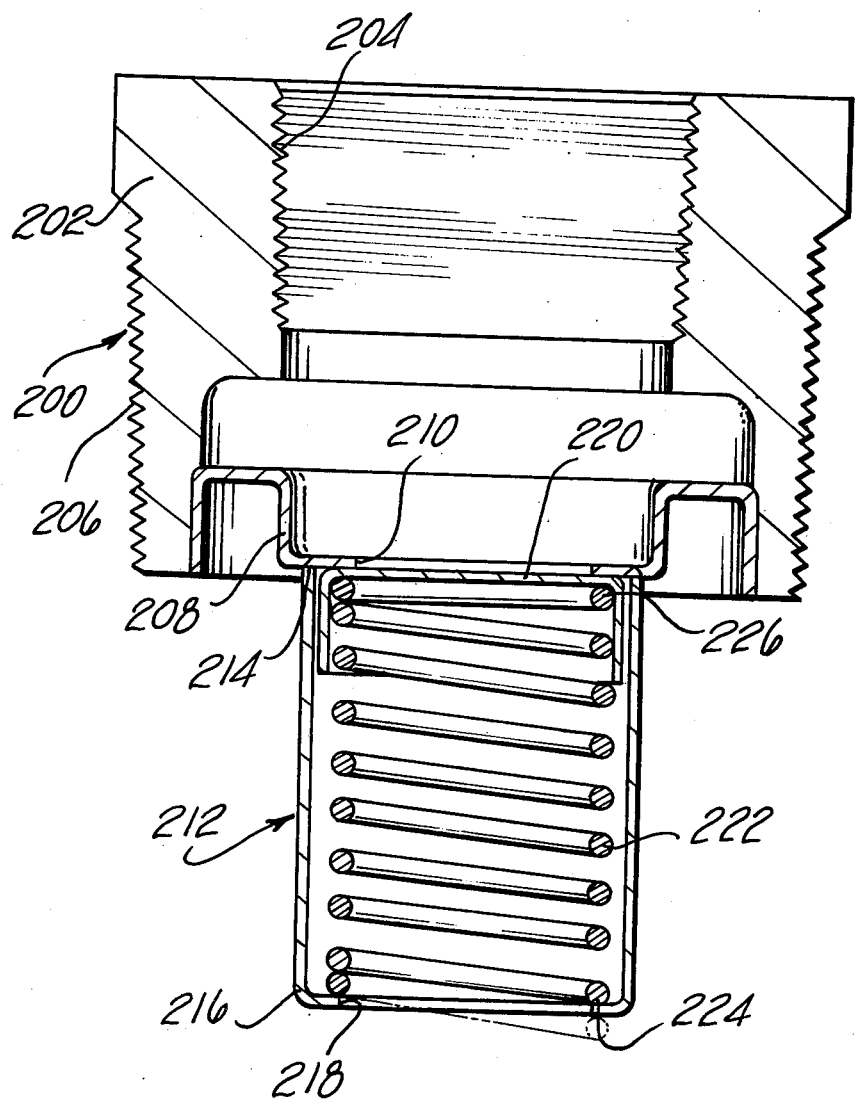
FIG. 6 is a sectional view illustrating a still further modification of the relief valve of the present invention.

With reference now to FIG. 6, a further modification of the relief valve 200 is thereshown and comprises a reducing bushing 202. The bushing 202 includes an internally threaded throughbore 204 and an externally threaded outer periphery 206 for connection to a fluid system in the fashion that has been previously described.

A spring seat 208 having a through bore 210 is secured to the bushing 202 coaxially with the bushing throughbore 204. In addition, an elongated and perforated cup-shaped spring retainer 212 having an open end 214 is coaxially secured at the end 214 to the seat 208. The opposite longitudinal end 216 of the retainer 212 also includes a circular opening 218.

A cup-shaped valve member 220 is positioned within the interior of the retainer 212 and cooperates with the valve seat 208 so that with the valve member 220 abutting against the valve seat 208 as shown in FIG. 6, the valve member prohibits fluid communication through the relief valve.

A helical spring 222 is also positioned within the interior of the retainer 212. The spring 222 has an outside diameter greater than the diameter of the opening 218 but can be screwed into and out from the opening 218 due to its helical shape. Once positioned within the interior of the retainer 212, the spring 222 abuts at one end 224 against the retainer 212 and at its other end 226 against the valve member to urge the valve member 220 against the seat 208.

The relief opening pressure for the valve 200 can be simply varied by substituting the spring 222 for a spring having a different longitudinal length. For example, assuming that the length of the retainer is one inch, a spring having a free length of 1.39 inches can provide a valve opening pressure of three psi. On the other hand, a spring of the same type but having a free length of 1.70 inches can provide a valve opening pressure of 25 psi.

The operation of the relief valve according to the present invention will be described with reference to the embodiment shown in FIGS. 1 and 3, it being understood that a similar description will likewise apply to the modifications of the relief valve illustrated in FIGS. 2, 4 and 5.

The relief valve 10 is first connected to the fluid system by securing the reducing bushing 12 to the standard fluid connectors 20 and 16 in the fashion that has been previously described. In this fashion, the relief valve 10 does not require a separate housing or dual fluid connectors but rather can be directly connected within a fluid line.

After connection of the relief valve 10 with the fluid connectors 20 and 16, the relief valve 10 acts as a one way valve and will only permit fluid flow from the fluid connector 20 and to the fluid connector 16. Moreover, the relief valve 10 will open, i.e. the valve member 40 becomes spaced away from its valve seat only when the fluid pressure in the fluid connector 20 exceeds the fluid pressure in the fluid connector 16 by a predetermined amount which is determined by the compression of the helical spring 42. The opening pressure for the relief valve 10, however, can be simply and easily adjusted by repositioning the stop pin 52, and thus the spring retainer 48, which simultaneously varies the compression of the helical spring 42.

From the foregoing, it can be seen that the relief valve according to the present invention provides a simple relief valve which can be directly connected to a fluid line in the fluid system without the necessity of the relief valve housing or the dual fluid connectors for such a housing. Moreover, the opening pressure for the relief valve can be simply and rapidly adjusted as required by merely changing the position of the spring retainer along the perforated tube.

Moreover, the relief valve 10 according to the present invention provides a simple, inexpensive and yet totally effective guide rod 124 and its associated spring retainer 120 which acts as a guide plate for maintaining the orientation of the valve member 114 coaxial with respect to the perforated tube 112 as the valve member 114 moves between its open and its closed position. Thus, cocking and jamming of the valve member 114 within the tube 112 from high pressure surges is effectively eliminated.

Having described my invention, however, many modifications thereto will become apparent to those skilled in the art to which it pertains without deviation from the spirit of the invention as defined by the scope of the appended claims.

We claim:

1. A relief valve for use with a fluid system comprising:
    a fluid fitting having a throughbore, first means formed on the fitting for connecting said fitting to a fluid connector on a fluid system and second means formed on the fluid fitting for connecting said fluid fitting to a second fluid connector on the fluid system whereby the fitting through bore fluidly communicates with one of the fluid connectors;
    a valve seat having a fluid passageway and means for securing said valve seat to said fitting;
    a valve member movable between a closed position in which the valve member abuts against the valve seat and prevents fluid flow through the valve seat passageway and open positions in which said valve member is spaced apart from said valve seat to permit fluid flow through said valve seat passageway and also through said fluid fitting through bore;
    means for resiliently urging said valve member toward its closed position;
    an elongated tube secured to said fluid fitting, said valve seat being secured to one end of the tube, said resilient means being positioned within the interior of the tube;
    a retainer;
    means for securing said retainer within the interior of the tube at a position spaced from said end of said tube so that said resilient means is entrapped between the retainer and said valve member;
    wherein said means for securing said retainer to said tube further comprises means for longitudinally adjustably securing said retainer to said tube to thereby vary the compression of said resilient means; and
    wherein said tube has a plurality of longitudinally spaced and diametrically opposed apertures and wherein said adjustable securing means further comprises a pin extending through a pair of diametrically opposed apertures in said tube.

2. The invention as defined in claim 1 wherein said resilient means further comprises a helical spring.

3. The invention as defined in claim 1 wherein said valve member is movable along the axis of said tube between its open and closed positions, said relief valve further comprising means for maintaining said valve member in a predetermined orientation with respect to said axis despite longitudinal displacement of said valve member along said tube.

4. The invention as defined in claim 3 wherein said maintaining means further comprises an elongated guide rod secured at one end to the valve member and slidably positioned through an aperture in the retainer at its other end.

5. The invention as defined in claim 4 wherein said guide rod is coaxial with said tube.

6. A relief valve for use with a fluid system comprising:
    a fluid fitting having a through bore, first means formed on the fitting for connecting said fitting to a fluid connector on a fluid system and second means formed on the fluid fitting for connecting said fluid fitting to a second fluid connector on the fluid system whereby the fitting through bore fluidly communicates with one of the fluid connectors;

a valve seat having a fluid passageway and means for securing said valve seat to said fitting;

a valve member movable between a closed position in which the valve member abuts against the valve seat and prevents fluid flow through the valve seat passageway and open positions in which said valve member is spaced apart from said valve seat to permit fluid flow through said valve seat passageway and also through said fluid fitting through bore;

means for resiliently urging said valve member toward its closed position;

wherein said resilient means comprises a helical spring and wherein said valve further comprises an elongated tubular spring retainer secured at one end to said valve seat, said spring being positioned with said retainer so that one end of said spring abuts against the valve member and means for securing the other end of the spring to the other end of the retainer; and wherein said spring has a first cross-sectional shape and wherein the other end of said retainer includes an aperture having a second cross-sectional shape, said second shape being smaller in at least one dimension than said first shape but sufficiently large to permit said spring to be screwed into the interior of said retainer through said aperture whereby the opening pressure of said valve can be varied by substituting for said spring with a new spring having a different longitudinal length.

* * * * *

UNITED STATES PATENT AND TRADEMARK OFFICE
CERTIFICATE OF CORRECTION

PATENT NO. : 4,265,271
DATED : May 5, 1981
INVENTOR(S) : Borje O. Rosaen et al.

It is certified that error appears in the above—identified patent and that said Letters Patent is hereby corrected as shown below:

Column 2, line 12, "it" should read -- its --.
Column 2, line 36, "willbe" should read -- will be --.
Column 3, line 8, after "valve", insert -- seat --.
Column 5, line 56, delete "10";

Signed and Sealed this

Fifteenth Day of September 1981

|SEAL|

Attest:

GERALD J. MOSSINGHOFF

Attesting Officer     Commissioner of Patents and Trademarks